United States Patent
August et al.

(10) Patent No.: US 10,256,580 B2
(45) Date of Patent: Apr. 9, 2019

(54) POWER CONNECTORS WITH INTEGRATED FUSE SUPPORTS, AND ASSOCIATED SYSTEMS AND METHODS

(71) Applicant: Superwinch, LLC, Dayville, CT (US)

(72) Inventors: Jacob August, Sherwood, OR (US); Ty Hargroder, Los Angeles, CA (US); Brent Nasset, Salem, OR (US)

(73) Assignee: Superwinch, LLC, Dayville, CT (US)

( * ) Notice: Subject to any disclaimer, the term of this patent is extended or adjusted under 35 U.S.C. 154(b) by 0 days.

(21) Appl. No.: 15/722,396

(22) Filed: Oct. 2, 2017

(65) Prior Publication Data

US 2018/0123295 A1 May 3, 2018

Related U.S. Application Data

(60) Provisional application No. 62/403,642, filed on Oct. 3, 2016.

(51) Int. Cl.
*H01R 13/684* (2011.01)
*H01H 85/20* (2006.01)
(Continued)

(52) U.S. Cl.
CPC ......... *H01R 13/684* (2013.01); *H01H 85/203* (2013.01); *H01R 13/5213* (2013.01);
(Continued)

(58) Field of Classification Search
CPC .... H01H 85/203; H01H 27/04; H01R 13/684; H01R 11/24; H01R 13/7032; H01R 31/085
(Continued)

(56) References Cited

U.S. PATENT DOCUMENTS 2,361,858 A 10/1944 Maginniss
3,740,694 A * 6/1973 Fisher .................. H01R 13/453
439/138
(Continued)

FOREIGN PATENT DOCUMENTS

CN 103465877 12/2013
DE 102012218463 4/2014
(Continued)

OTHER PUBLICATIONS

U.S. Appl. No. 15/640,091, filed Jun. 30, 2017, Dennis.
(Continued)

*Primary Examiner* — Hae Moon Hyeon
*Assistant Examiner* — Peter G Leigh
(74) *Attorney, Agent, or Firm* — Perkins Coie LLP

(57) ABSTRACT

Power connectors with integrated fuse support, and associated systems and methods are disclosed. A representative power connector can include a power port and a mating plug. The power port can include a fuse support having first and second fuse receptacles, wherein the first fuse receptacle is connectable to a first supply cable. The power port can include first and second port terminals, wherein the first port terminal is connectable to a second supply cable. A jumper cable can be connected between the second port terminal and the second fuse receptacle. The plug can include a housing configured to enclose the fuse support between the plug and the power port when the plug is mated to the power port. The plug can include first and second plug terminals mateable with the first and second port terminals.

12 Claims, 7 Drawing Sheets

(51) Int. Cl.
*H01R 13/52* (2006.01)
*H01R 13/622* (2006.01)
*H01R 13/64* (2006.01)
*B60R 16/03* (2006.01)
*H01R 13/625* (2006.01)

(52) U.S. Cl.
CPC .......... *H01R 13/622* (2013.01); *H01R 13/64* (2013.01); *B60R 16/03* (2013.01); *H01R 13/625* (2013.01); *H01R 2201/26* (2013.01)

(58) Field of Classification Search
USPC .............................. 439/507, 602.08; 374/141
See application file for complete search history.

(56) References Cited

U.S. PATENT DOCUMENTS

| | | | |
|---|---|---|---|
| 4,004,780 A | 1/1977 | Kuzarov | |
| 4,307,925 A * | 12/1981 | Drew | H01R 13/713 |
| | | | 439/620.08 |
| 4,475,163 A | 10/1984 | Chandler et al. | |
| 5,167,535 A * | 12/1992 | Kovacik | H01R 13/713 |
| | | | 200/51 R |
| 5,211,570 A * | 5/1993 | Bitney | H01R 13/623 |
| | | | 439/320 |
| 5,783,986 A * | 7/1998 | Huang | H01R 13/7137 |
| | | | 337/333 |
| 5,995,347 A | 11/1999 | Rudd et al. | |
| 6,210,036 B1 * | 4/2001 | Eberle | H01R 13/6683 |
| | | | 337/2 |
| 6,358,076 B1 * | 3/2002 | Haag | H01R 13/6395 |
| | | | 439/320 |
| D471,338 S | 3/2003 | Hodge | |
| D473,992 S | 4/2003 | Hodge | |
| D489,157 S | 4/2004 | Lawson | |
| 6,864,650 B2 | 3/2005 | Heravi et al. | |
| 6,882,917 B2 | 4/2005 | Pillar | |
| 6,885,920 B2 | 4/2005 | Yakes et al. | |
| D513,650 S | 1/2006 | Elliott | |
| 7,021,968 B1 * | 4/2006 | Lu | H01R 13/502 |
| | | | 439/620.07 |
| 7,063,306 B2 | 6/2006 | Sanders et al. | |
| D532,577 S | 11/2006 | Elliott et al. | |
| 7,184,866 B2 | 2/2007 | Squires et al. | |
| 7,201,366 B2 | 4/2007 | Sanders et al. | |
| D550,923 S | 9/2007 | Huang | |
| D555,874 S | 11/2007 | Elliott et al. | |
| 7,392,122 B2 | 6/2008 | Pillar | |
| 7,511,443 B2 | 3/2009 | Townsend et al. | |
| D599,524 S | 9/2009 | Averill et al. | |
| 7,613,003 B2 * | 11/2009 | Pavlovic | B60L 3/0069 |
| | | | 361/709 |
| 7,705,706 B2 * | 4/2010 | Ding | H01R 13/68 |
| | | | 337/198 |
| 7,770,847 B1 | 8/2010 | Severson | |
| 7,891,641 B1 | 2/2011 | Miller | |
| 7,984,894 B1 | 7/2011 | Chauza | |
| 7,985,098 B2 * | 7/2011 | De Chazal | H01H 9/104 |
| | | | 439/620.31 |
| 8,055,403 B2 | 11/2011 | Lowrey et al. | |
| 8,076,885 B2 | 12/2011 | Heravi et al. | |
| 8,221,165 B2 * | 7/2012 | DeWitte | B60L 11/1818 |
| | | | 439/620.26 |
| 8,248,230 B2 | 8/2012 | Covaro | |
| D670,660 S | 11/2012 | Cook | |
| 8,306,690 B2 | 11/2012 | Bertness et al. | |
| 8,328,581 B2 * | 12/2012 | de Chazal | H01R 13/684 |
| | | | 439/620.28 |
| D685,750 S | 7/2013 | Nakagawa | |
| 8,554,440 B1 | 10/2013 | Davis | |
| D703,414 S | 4/2014 | Fretz et al. | |
| 8,723,477 B2 * | 5/2014 | Gaul | B60L 3/0069 |
| | | | 320/109 |
| 8,944,217 B2 | 2/2015 | Anasis | |
| 8,944,413 B1 | 2/2015 | Hatch et al. | |
| 9,011,180 B2 * | 4/2015 | Sharaf | H01R 13/68 |
| | | | 439/620.3 |
| 9,014,913 B2 | 4/2015 | Heravi et al. | |
| 9,124,021 B2 * | 9/2015 | Kashiwada | H01R 13/512 |
| D740,513 S | 10/2015 | Fretz et al. | |
| D741,038 S | 10/2015 | Huang | |
| 9,315,364 B2 | 4/2016 | Averill et al. | |
| D766,843 S | 9/2016 | Fretz et al. | |
| D776,395 S | 1/2017 | Fretz et al. | |
| 9,537,335 B2 | 1/2017 | Furui et al. | |
| D779,768 S | 2/2017 | Fretz et al. | |
| D784,934 S | 4/2017 | Fretz et al. | |
| D799,143 S | 10/2017 | Cui | |
| D799,144 S | 10/2017 | Cui | |
| 9,779,557 B2 | 10/2017 | Hauser et al. | |
| 9,810,704 B2 | 11/2017 | Holmes | |
| D811,683 S | 2/2018 | Frazier | |
| D811,684 S | 2/2018 | Fretz et al. | |
| D811,685 S | 2/2018 | Fretz et al. | |
| 9,923,311 B2 * | 3/2018 | Blakborn | H01R 13/713 |
| D815,386 S | 4/2018 | August | |
| D816,937 S | 5/2018 | Fretz et al. | |
| D816,938 S | 5/2018 | Fretz et al. | |
| 9,975,742 B1 | 5/2018 | Mason | |
| 2002/0156574 A1 | 10/2002 | Fortin | |
| 2008/0001132 A1 | 1/2008 | Huang et al. | |
| 2008/0166430 A1 | 7/2008 | Doyle et al. | |
| 2009/0284877 A1 | 11/2009 | Heravi et al. | |
| 2010/0319910 A1 | 12/2010 | Ives et al. | |
| 2011/0065546 A1 | 3/2011 | Xie et al. | |
| 2011/0104940 A1 * | 5/2011 | Rabu | H01R 13/7137 |
| | | | 439/502 |
| 2013/0154821 A1 | 6/2013 | Miller et al. | |
| 2013/0304278 A1 | 11/2013 | Chen | |
| 2014/0001427 A1 | 1/2014 | Fretz et al. | |
| 2014/0113500 A1 * | 4/2014 | Goyal | H01L 31/05 |
| | | | 439/698 |
| 2014/0193990 A1 * | 7/2014 | Zhao | H01R 13/648 |
| | | | 439/160 |
| 2014/0257631 A1 | 9/2014 | Heravi et al. | |
| 2015/0140849 A1 * | 5/2015 | Goyal | H01L 31/05 |
| | | | 439/275 |
| 2015/0191334 A1 | 7/2015 | Heravi et al. | |
| 2015/0298597 A1 | 10/2015 | Salter et al. | |
| 2016/0046468 A1 | 2/2016 | Heravi et al. | |
| 2016/0104974 A1 * | 4/2016 | Yamaguchi | H01H 85/202 |
| | | | 439/607.01 |
| 2016/0233625 A1 * | 8/2016 | Kato | H01R 13/688 |
| 2016/0311667 A1 | 10/2016 | Huang | |
| 2016/0311668 A1 | 10/2016 | Huang | |
| 2017/0062148 A1 | 3/2017 | Legel | |
| 2017/0320709 A1 | 11/2017 | Frazier et al. | |
| 2018/0118528 A1 | 5/2018 | August | |
| 2018/0118530 A1 | 5/2018 | August | |
| 2018/0118531 A1 | 5/2018 | August | |
| 2018/0118533 A1 | 5/2018 | Karambelas | |
| 2018/0170725 A1 | 6/2018 | August | |
| 2018/0170726 A1 | 6/2018 | August | |

FOREIGN PATENT DOCUMENTS

| | | |
|---|---|---|
| DE | 102015215664 | 2/2016 |
| EP | 2266915 | 12/2010 |
| GB | 2486265 | 6/2012 |
| WO | WO-2016046898 | 3/2016 |
| WO | WO-2016112980 | 7/2016 |

OTHER PUBLICATIONS

U.S. Appl. No. 29/563,917, filed Nov. 14, 2017, August.
U.S. Appl. No. 29/563,921, filed May 9, 2016, Frazier.
U.S. Appl. No. 29/625,975, filed Nov. 14, 2017, August.
U.S. Appl. No. 29/626,014, filed Nov. 14, 2017, August.
"Automotive Winch Intruction Manual," Comeup Industries ; Inc., http://www.comeup.com/Archive/_eng/all_pdf_eng/Comeup_

(56) References Cited

OTHER PUBLICATIONS

Automotive_Winch_Instruction_Manual-eng.pdf, Aug. 1, 2013, 22 pages.
Superwinch, "Superwinch SI Industrial Winches," YouTube, https://www.youtube.com/watch?v=bMiDddvCZgs>, accessed Nov. 21, 2016, 1 page.
"The Comeup Cone Brake Structure," Comeup USA, http://comeupusa.com/2017/04/the-comeup-cone-brake-structure/, Apr. 28, 2017, 2 pages.

\* cited by examiner

POWER CONNECTORS WITH INTEGRATED FUSE SUPPORTS, AND ASSOCIATED SYSTEMS AND METHODS

CROSS-REFERENCE TO RELATED APPLICATION

This application claims the benefit of and priority to U.S. Patent Application No. 62/403,642, filed Oct. 3, 2016, the disclosure of which is incorporated herein by reference in its entirety.

TECHNICAL FIELD

This present technology is directed to winches and, more specifically, to electrical power connectors for winches, and associated systems and methods.

BACKGROUND

When an accessory is added to a vehicle, the installer must typically route wiring and provide a proper electrical connection to the vehicle's battery. Such an installation typically involves adding an inline fuse holder, or running wiring to a fused source on an existing fuse block of the vehicle. In any case, it can be a tedious and time consuming process to provide power connections to vehicle accessories, particularly when the accessory to be installed is a relatively high current device, such as a winch, compressor, or spotlight, which requires heavy cables.

BRIEF DESCRIPTION OF THE DRAWINGS

Embodiments of representative power connectors with integrated fuse supports described here may be better understood by referring to the following Detailed Description in conjunction with the accompanying drawings, in which like reference numerals indicate identical or functionally similar elements.

Figure 1:
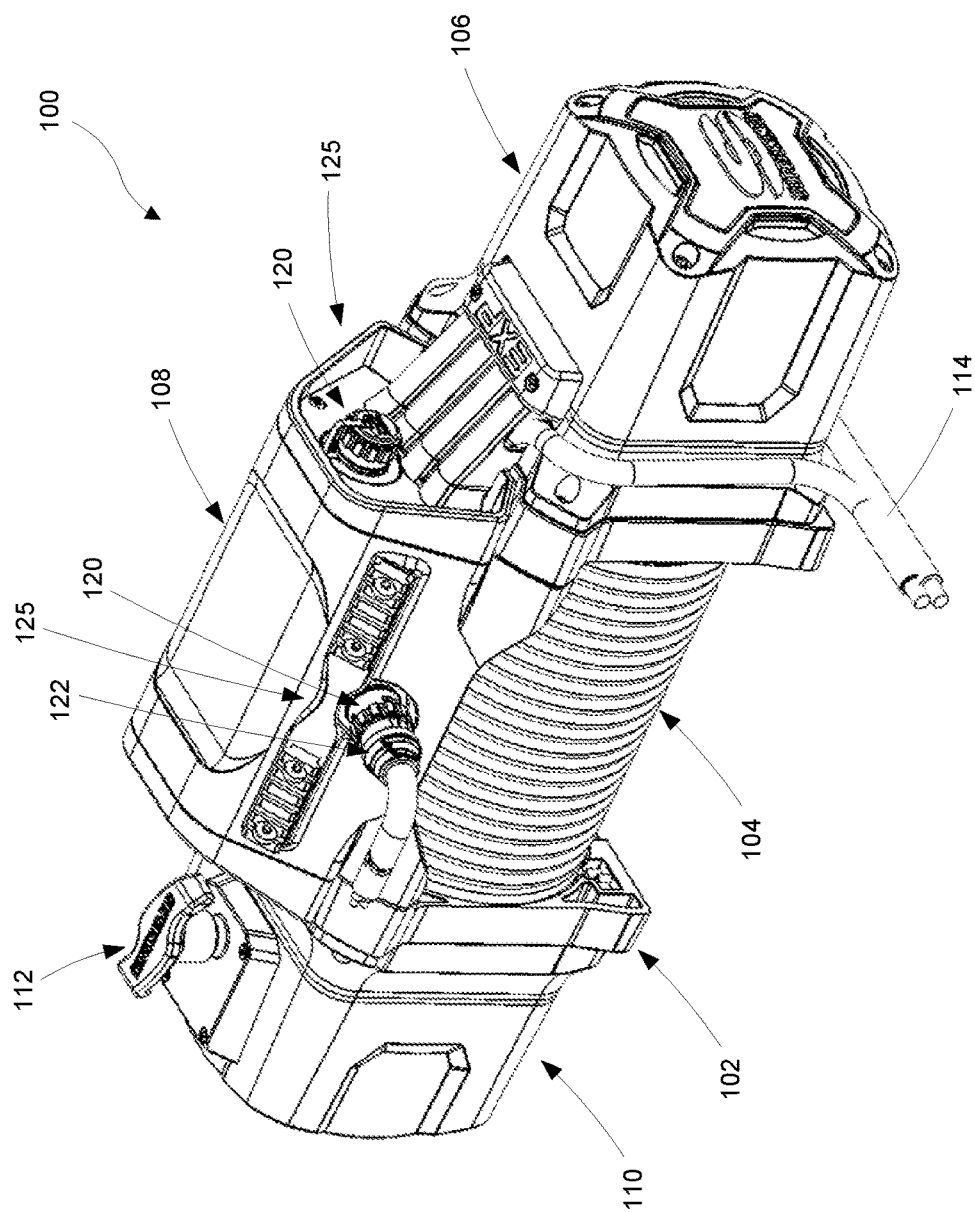
FIG. 1 is an isometric view of a winch incorporating a power connector having an integrated fuse support configured in accordance with some embodiments of the present technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Overview

Disclosed herein are power connectors including a power port and mating plug. The power port can provide power to auxiliary equipment such as spotlights and air compressors, for example. A user can quickly and conveniently connect auxiliary equipment to the power port with the mating plug and cable without having to route additional cables to the vehicle's battery and/or provide a separate fuse block. The fuse is directly accessible when the power port and plug are disconnected from each other and the supplied power is routed through the fuse located within the power port.

General Description

Various examples of the devices introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

FIG. 1 illustrates a winch 100 incorporating power connectors 125 with integrated fuse supports according to a representative embodiment of the present technology. The winch 100 includes a frame assembly 102 that supports a drive motor 106 which powers a cable drum 104. The drive motor 106 drives the drum 104 through a gear train assembly 110. A clutch mechanism 112 engages and disengages the drum 104 from the gear train assembly 110 to facilitate quickly and easily unwinding the cable from the drum 104.

Figure 2:
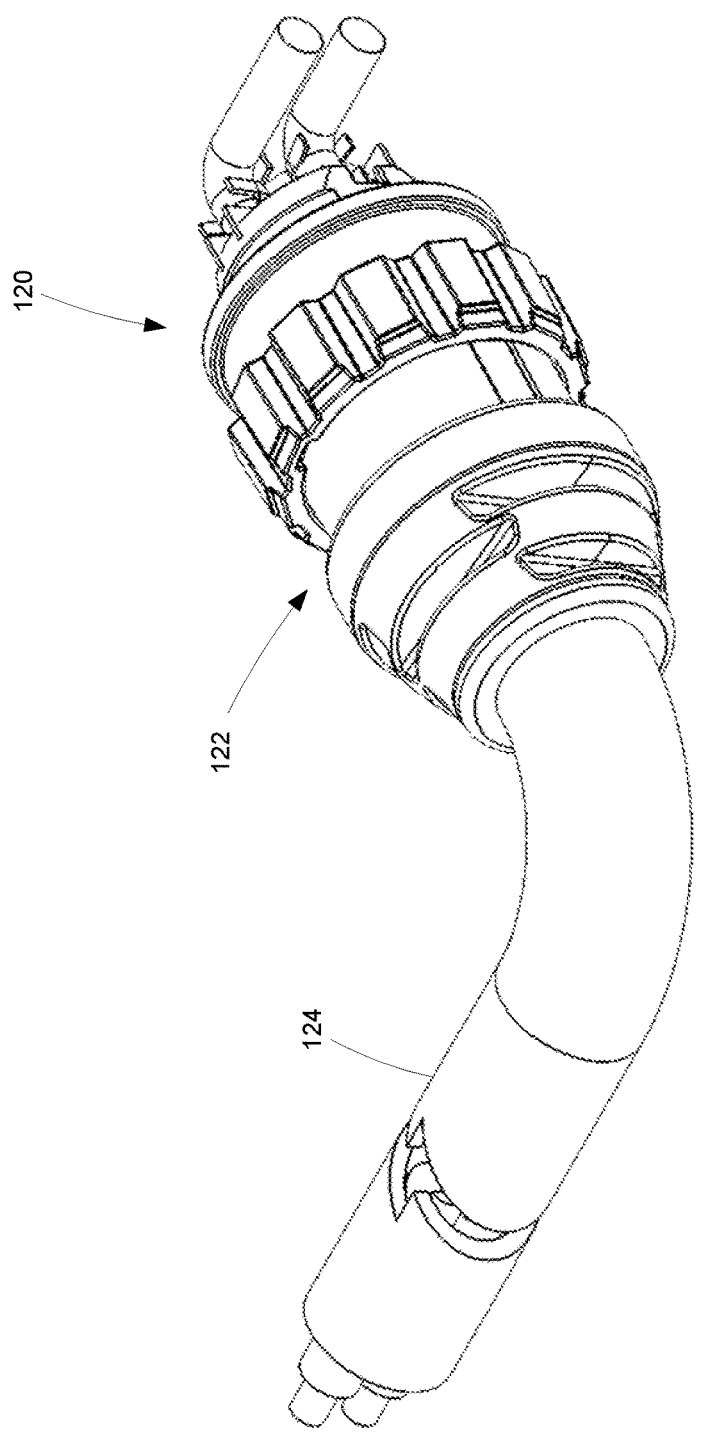
FIG. 2 is an isometric view of the power connector introduced in FIG. 1.

The drive motor 106 is powered by cables 114 connected to the vehicle's power supply (e.g., battery). A control pack or module 108 spans across the cable drum 104 and houses control circuitry for the winch 100. In addition, the control pack 108 includes one or more power connectors 125 (two are shown in FIG. 1) mounted thereto. Each power connector 125 can include a power port 120 that is ultimately electrically connected to the power cables 114. Therefore, the power ports 120 can provide power to auxiliary equipment such as spotlights and air compressors (not shown), for example. With further reference to FIG. 2, a user can quickly and conveniently connect auxiliary equipment to the power port 120 with a mating plug 122 and cable 124 without having to route additional cables to the vehicle's battery and/or provide a separate fuse block. In some embodiments, the cables 114 can be connected to the vehicle via another power connector 125. In any of these embodiments, the power connector 125 can include multiple, separable components; e.g., the port 120 and the mating plug 122.

Figure 3:
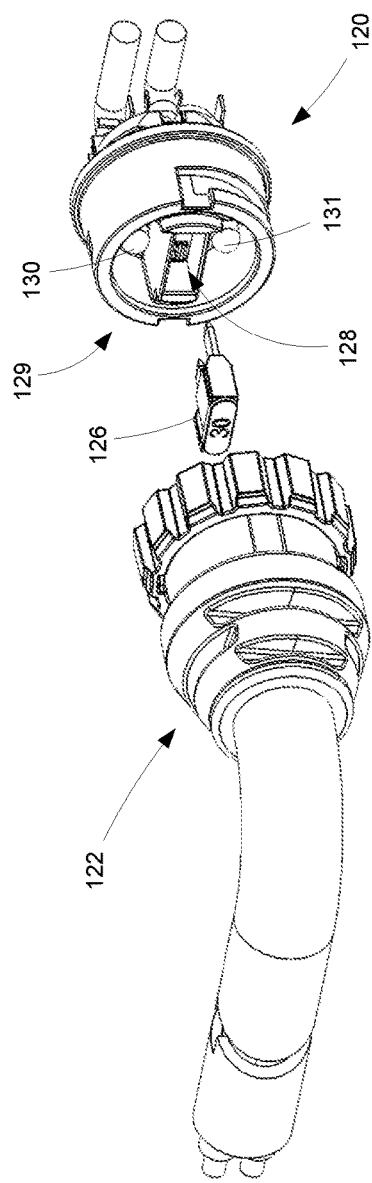
FIG. 3 is an isometric view of a plug disconnected from a power port as viewed from the plug side, in accordance with some embodiments of the present technology.
Figure 4:
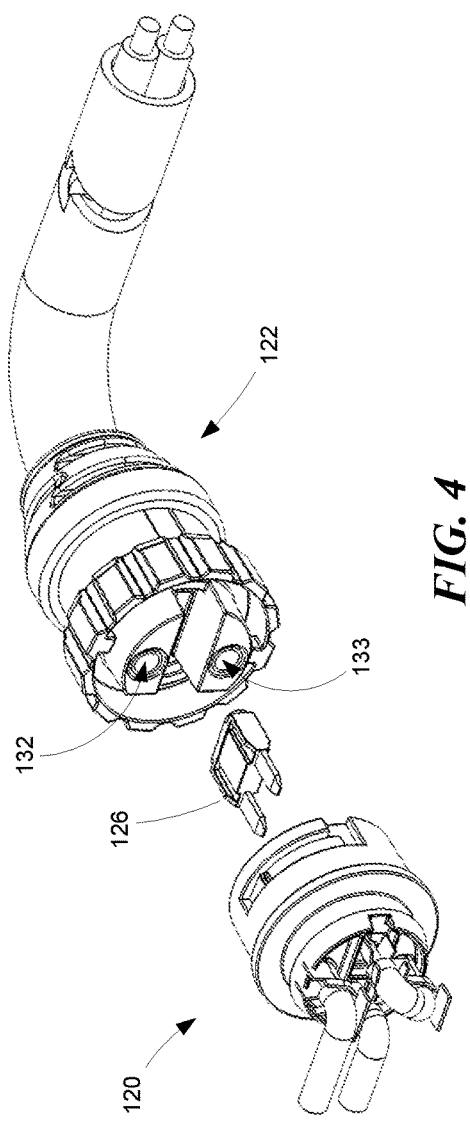
FIG. 4 is an isometric view of the plug disconnected from the power port as viewed from the port side.

As shown in FIG. 3, the power port 120 can include a fuse support 129 (e.g., a socket 128) configured to receive a blade-style fuse 126. In some embodiments, the fuse 126 is a 30 amp fuse, and in some embodiments, other current ratings and styles of fuses can be used. The power port 120 can include port terminals, such as first and second male terminal pins 130 and 131 that mate with corresponding structures carried by the plug 122. For example, as shown in FIG. 4, the plug 122 can include plug terminals, such as female receptacles 132 and 133 configured to receive the male terminal pins 130 and 131, respectively. As shown in FIGS. 3 and 4, the fuse 126 is directly accessible when the power port 120 and plug 122 are disconnected from each other.

Figure 5:
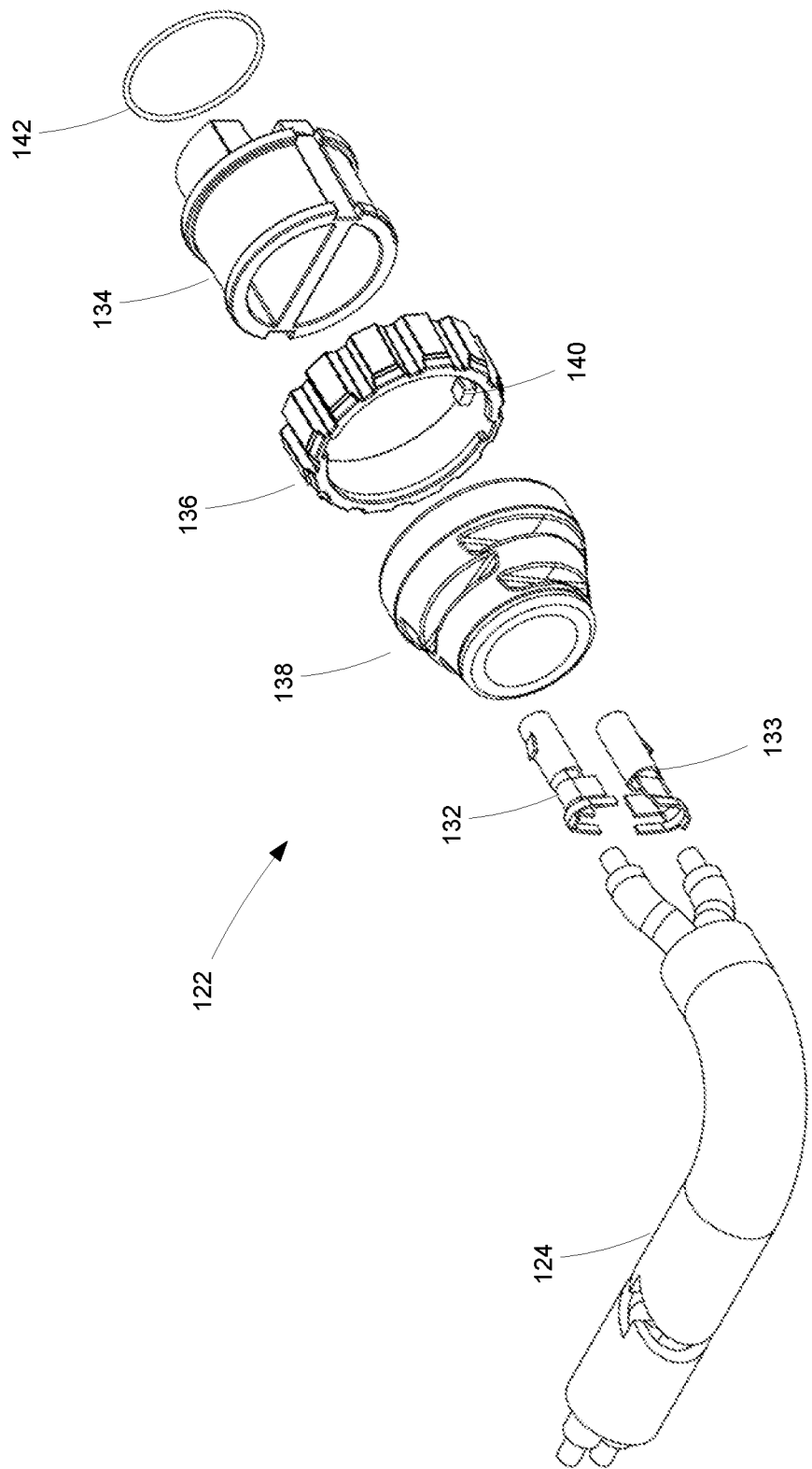
FIG. 5 is an exploded isometric view of the plug shown in FIGS. 3 and 4.
Figure 6:
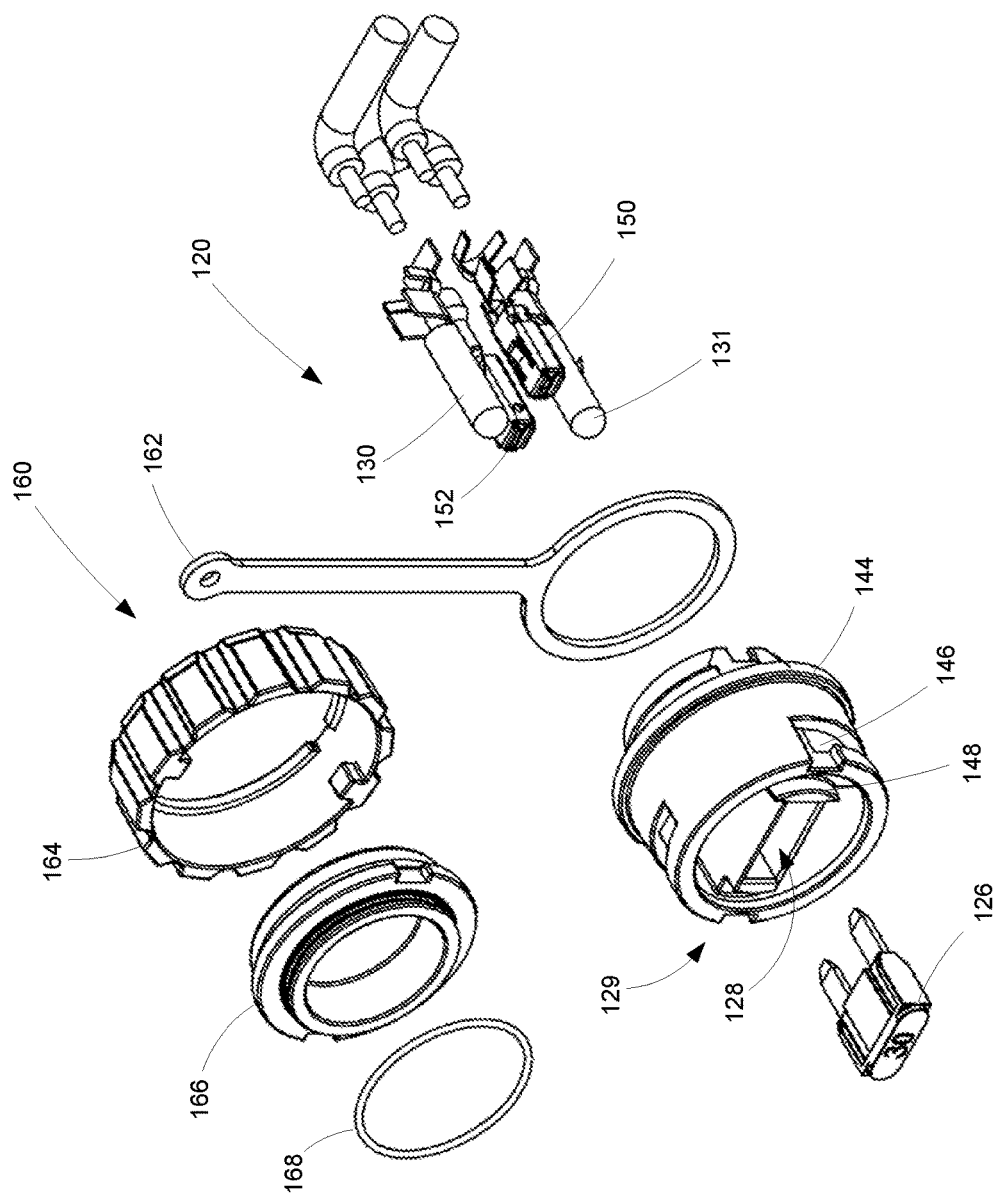
FIG. 6 is an exploded isometric view of the power port shown in FIGS. 3 and 4.

As shown in FIG. 5, the plug 122 can include a plug housing 134 enclosing the female receptacles 132 and 133. The cable 124 connects at one end to the female receptacles 132 and 133 and can be connected at the other end to various auxiliary devices. The plug 122 also includes a housing cover 138 and a locking ring 136. In some embodiments, the plug 122 includes an o-ring seal 142 to provide a moisture-tight seal with the power port 120. The locking ring 136 includes a tab 140 configured to engage a groove 146 formed in the power port housing 144 (e.g., in an external or circumferential surface), as shown in FIG. 6, to secure the plug 122 to the power port 120.

Figure 7:
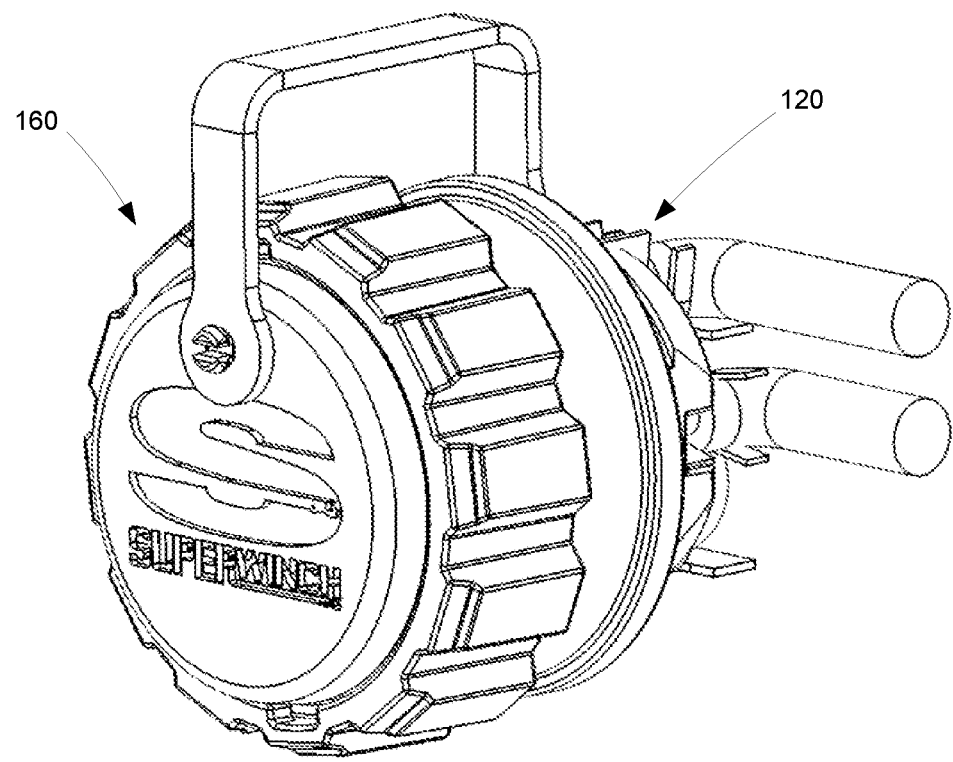
FIG. 7 is an isometric view of the power port with a dust cap installed in accordance with some embodiments of the present technology.

In some embodiments, the power port housing 144 can include an indexing feature 148 to orient the power port 120 and plug 122 with the proper polarity. The male terminal pins 130 and 131 are enclosed in the power port housing 144 and a pair of fuse receptacles 150 and 152 are enclosed in the fuse socket 128. In some embodiments, a dust cap assembly 160 can be attached to the power port 120 (e.g., the housing 144) to protect the fuse 126 and power port connections (indicated by reference numbers 130, 131, 150, 152). The dust cap assembly 160 can include a tether 162 attachable to the power port 120 and the dust cap 166. A cap ring 164 can be attached to the dust cap 164 and can be constructed similarly to the locking ring 136 (FIG. 5). In some embodiments, the dust cap 166 includes an o-ring seal 168 to help protect the power port 120 when the dust cap assembly 160 is secured to the power port 120 as shown in FIG. 7.

Figure 9:
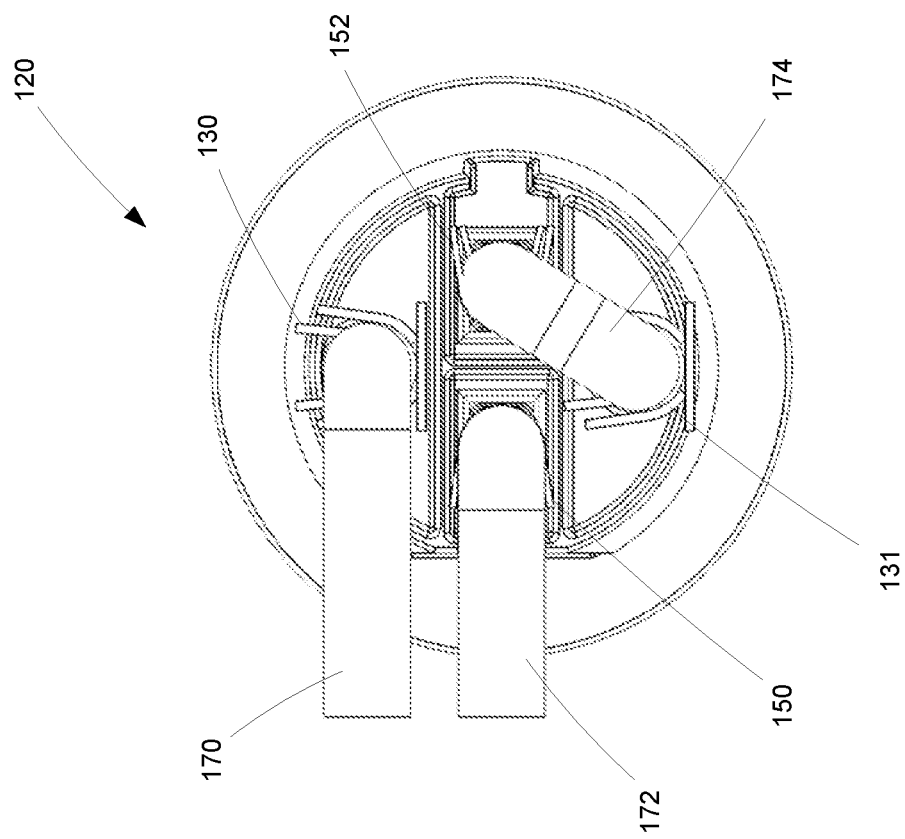
FIG. 9 is a rear view of the power port shown in FIG. 8.
Figure 8:
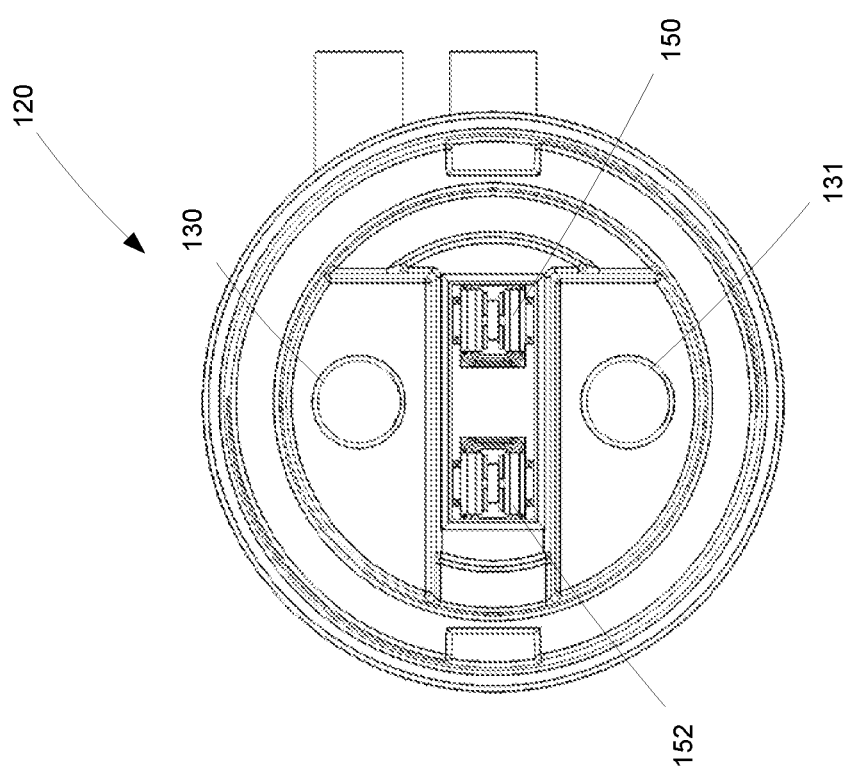
FIG. 8 is a front view of a representative power port including a fuse socket.

With reference to FIGS. 8 and 9, power is supplied to the power port 120 with first and second input cables 170 and 172. The first input cable 170 is connected directly to the first male terminal pin 130. The second input cable 172 connects to the second male terminal pin 131 via the fuse receptacles 150, 152, the fuse 126, and a jumper cable 174. The jumper cable 174 can be connected between the second male terminal pin 131 and the fuse receptacle 152. Accordingly, the supplied power is routed through the fuse 126 (FIG. 6) within the power port 120. Other suitable wiring configurations can be used in some embodiments. For example, the first and second cables 170 and 172 can be reversed, the fuse receptacles 150 and 152 can be reversed, and/or the first and second male terminal pins 130 and 131 can be reversed.

One feature of power connectors with integrated fuse supports having configurations in accordance with embodiments described above, is that the fuse is accessible and replaceable when the plug is disconnected from the corresponding port. An advantage of this arrangement is that the fuse can be easily replaced without having to disassemble the control module or trace wiring back to a fuse block and determine which fuse is potentially open. In addition, a user can quickly and conveniently connect auxiliary equipment to the power port with a mating plug and cable without having to route additional cables to the vehicle's battery and/or provide a separate fuse block.

Although power connectors with an integrated fuse support are shown and described herein in the context of a winch and auxiliary accessories, the disclosed technology is applicable to other devices, such as powered equipment generally. For example, the disclosed power connector with integrated fuse support can be used in automotive aftermarket, marine, and/or recreational vehicle applications, to name a few.

The above description, drawings, and appendices are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

In some embodiments, a representative power connector comprises a power port including a fuse socket and a plug mateable with the power port. The power port includes two male pins positioned on opposite sides of the fuse socket and the plug includes two female terminals mateable with the two male pins. When the plug is connected to the power port, the fuse socket is enclosed between the plug and power port.

In some embodiments, a representative power connector comprises a power port including a fuse socket and a plug mateable with the power port. The power port includes first and second male pins positioned on opposite sides of the fuse socket. The power port includes a first supply cable directly connected to the first male pin and a jumper cable connected between the second male pin and a first fuse receptacle associated with the fuse socket. A second supply cable is connected to a second fuse receptacle associated with the fuse socket. The plug includes two female terminals mateable with the two male pins. When the plug is connected to the power port, the fuse socket is enclosed between the plug and power port. The plug further includes a locking ring engageable with a groove around a circumference of the power port.

In some embodiments, a representative power connector comprises a power port and a mating plug. The power port can include a power port housing mountable to a device and having a groove formed around a circumference of the power port housing. The power port can include a fuse support having first and second fuse receptacles, wherein the first fuse receptacle is connectable to a first supply cable. The power port can also include first and second port terminals positioned on opposite sides of the fuse support, wherein the first port terminal is connectable to a second supply cable. A jumper cable can be connected between the second port terminal and the second fuse receptacle. The plug can include a plug housing configured to enclose the fuse support between the plug and the power port when the plug is mated to the power port and a locking ring engageable with the groove. The plug can include first and second plug terminals mateable with the first and second port terminals. In some embodiments, the first and second port terminals each comprise a male pin and the first and second plug terminals each comprise a female receptacle.

The following examples provide additional embodiments of the present technology.

EXAMPLES

1. A power port with integrated fuse support, comprising:
a power port housing connectable to a mating plug;
a fuse support having first and second fuse receptacles, wherein the first fuse receptacle is connectable to a first supply cable;
first and second port terminals, wherein the first port terminal is connectable to a second supply cable; and
a jumper cable connected between the second port terminal and the second fuse receptacle.

2. The power port of example 1, wherein the power port housing includes an outer surface having a groove positioned to engage a locking ring of the mating plug.

3. The power port of example 1 or 2, wherein the first and second port terminals each comprise a male pin.

4. The power port of any one of examples 1-3, wherein the first and second plug terminals each comprise a female receptacle.

5. The power port of any one of examples 1-4, wherein the fuse support comprises a socket.

6. The power port of any one of examples 1-5, wherein the first and second port terminals are positioned on opposite sides of the fuse support.

7. The power port of any one of examples 1-6, further comprising a dust cap assembly attached to the power port housing.

8. The power port of any one of examples 1-7, wherein the power port includes an indexing feature positioned to orient the power port housing and the mating plug with respect to each other.

9. A power connector, comprising:
a power port, including:
a fuse support having first and second fuse receptacles, wherein the first fuse receptacle is connectable to a first supply cable;
first and second port terminals, wherein the first port terminal is connectable to a second supply cable; and
a jumper cable connected between the second port terminal and the second fuse receptacle; and
a plug mateable with the power port, and including:
a housing positioned to enclose the fuse support between the plug and the power port when the plug is mated to the power port; and
first and second plug terminals mateable with the first and second port terminals.

10. The power connector of example 9, wherein the plug further comprises a locking ring engageable with a groove formed at least partially around an outer surface of the power port.

11. The power connector of example 9 or 10, wherein the first and second port terminals each comprise a male pin.

12. The power connector of any one of examples 9-11, wherein the first and second plug terminals each comprise a female receptacle.

13. The power connector of any one of examples 9-12, wherein the fuse support comprises a socket.

14. The power connector of any one of examples 9-13, wherein the first and second port terminals are positioned on opposite sides of the fuse support.

15. The power connector of any one of examples 9-14, further comprising a dust cap assembly attached to the power port.

16. The power connector of any one of examples 9-15, wherein the power port includes an indexing feature positioned to orient the power port and the plug with respect to each other.

17. A power connector, comprising:
a power port, including:
a power port housing mountable to a device and having an outer surface with a groove;
a fuse support having first and second fuse receptacles, wherein the first fuse receptacle is connectable to a first supply cable;
first and second port terminals positioned on opposite sides of the fuse support, wherein the first port terminal is connectable to a second supply cable; and
a jumper cable connected between the second port terminal and the second fuse receptacle; and
a plug mateable with the power port, including:
a plug housing configured to enclose the fuse support between the plug and the power port when the plug is mated to the power port;
a locking ring engageable with the groove; and
first and second plug terminals mateable with the first and second port terminals.

18. The power connector of example 17, wherein the first and second port terminals each comprise a male pin and the first and second plug terminals each comprise a female receptacle.

19. The power connector of example 17 or 18, wherein the fuse support comprises a socket.

20. The power connector of any one of examples 17-19, wherein the power port housing includes an indexing feature positioned to orient the power port and the plug with respect to each other.

What is claimed is:
1. A power connector, comprising:
a power port, including:
a fuse support having first and second fuse receptacles, wherein the first fuse receptacle is connectable to a first supply cable;
first and second port terminals, wherein the first port terminal is connectable to a second supply cable; and a jumper cable connected between the second port terminal and the second fuse receptacle; and a plug mateable with the power port, and including:
  a housing positioned to enclose the fuse support between the plug and the power port when the plug is mated to the power port; and
  first and second plug terminals mateable with the first and second port terminals.

2. The power connector of claim 1, wherein the plug further comprises a locking ring engageable with a groove formed at least partially around an outer surface of the power port.

3. The power connector of claim 1, wherein the first and second port terminals each comprise a male pin.

4. The power connector of claim 3, wherein the first and second plug terminals each comprise a female receptacle.

5. The power connector of claim 1, wherein the fuse support comprises a socket.

6. The power connector of claim 1, wherein the first and second port terminals are positioned on opposite sides of the fuse support.

7. The power connector of claim 1, further comprising a dust cap assembly attached to the power port.

8. The power connector of claim 1, wherein the power port includes an indexing feature positioned to orient the power port and the plug with respect to each other.

9. A power connector, comprising:
a power port, including:
  a power port housing mountable to a device and having an outer surface with a groove;
  a fuse support having first and second fuse receptacles, wherein the first fuse receptacle is connectable to a first supply cable;
  first and second port terminals positioned on opposite sides of the fuse support, wherein the first port terminal is connectable to a second supply cable; and
  a jumper cable connected between the second port terminal and the second fuse receptacle; and
a plug mateable with the power port, including:
  a plug housing configured to enclose the fuse support between the plug and the power port when the plug is mated to the power port;
  a locking ring engageable with the groove; and
  first and second plug terminals mateable with the first and second port terminals.

10. The power connector of claim 9, wherein the first and second port terminals each comprise a male pin and the first and second plug terminals each comprise a female receptacle.

11. The power connector of claim 9, wherein the fuse support comprises a socket.

12. The power connector of claim 9, wherein the power port housing includes an indexing feature positioned to orient the power port and the plug with respect to each other.

* * * * *